L. L. LEIGH.
SURFACE INDICATOR.
APPLICATION FILED JULY 17, 1909.
1,040,219.
Patented Oct. 1, 1912.
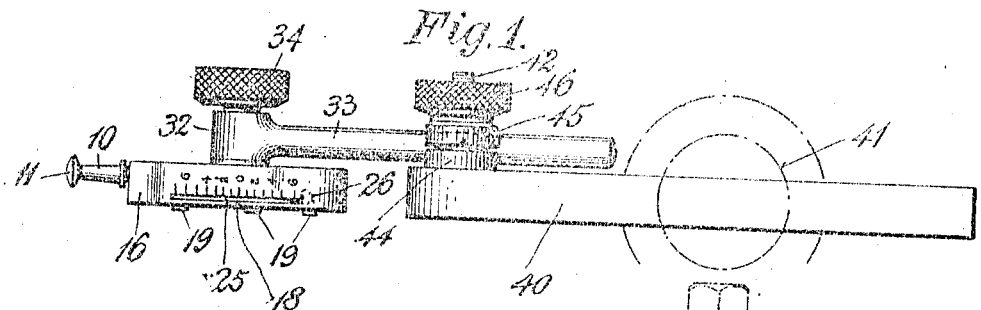
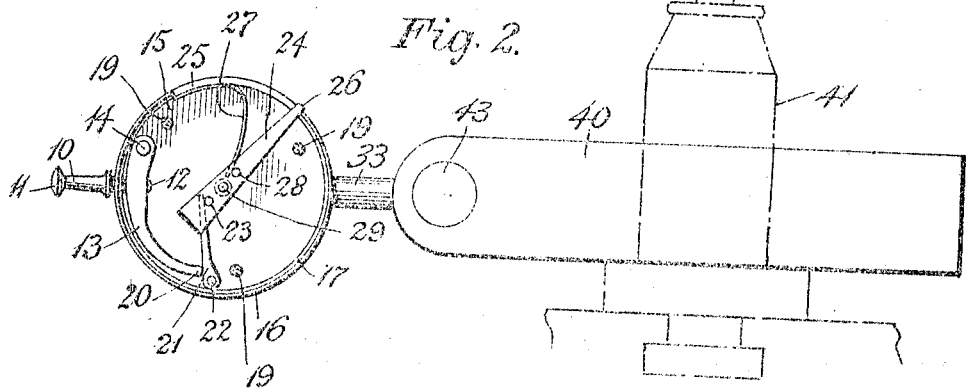
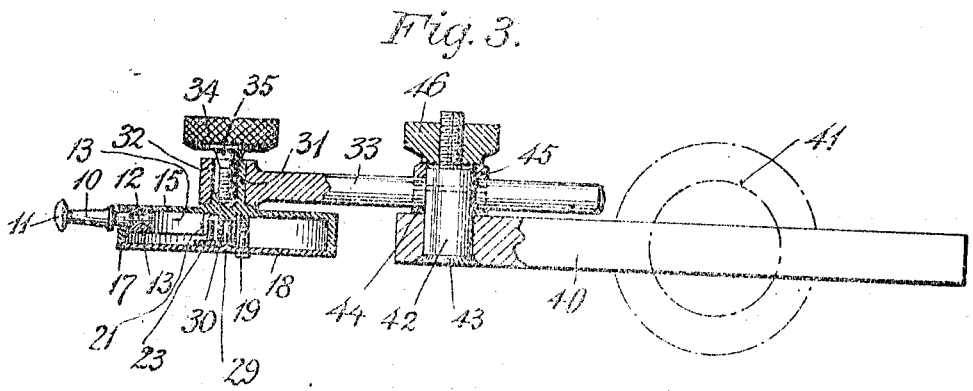
WITNESSES:
Louis Lucia.
R. W. Hevenor
INVENTOR.
L. L. Leigh,
BY Chas. F. Schmidt
ATTORNEY

UNITED STATES PATENT OFFICE.

LEWIS L. LEIGH, OF BRISTOL, CONNECTICUT.

SURFACE-INDICATOR.

1,040,219. Specification of Letters Patent. Patented Oct. 1, 1912.

Application filed July 17, 1909. Serial No. 508,174.

*To all whom it may concern:*

Be it known that I, LEWIS L. LEIGH, a citizen of the United States, and resident of Bristol, in the county of Hartford and State of Connecticut, have invented certain new and useful Improvements in Surface-Indicators, of which the following is a full, clear, and exact specification.

This invention relates to surface indicators, and more especially to that class thereof which are employed to determine the "true-running" condition of a piece of work in a lathe, grinding machine, or other machine tool, in order to enable the workman to set the same properly, or to determine its eccentricity or deviation from a true circle on its periphery.

My invention has for one of its objects, the provision of an instrument of this class which may be secured in a tool-post of a lathe, and which is adapted to be positioned so as to contact with the work in any desired manner without requiring a loosening of the device in the tool-post.

My invention has, furthermore, for its object, the improved organization of the feeler-member and the transfer of movement thereof to the indexing member as will be hereinafter described and the means of the attainment of which will be particularly pointed out in the claims.

My invention has been clearly illustrated in the accompanying drawings in which similar characters denote similar parts, and in which—

Figure 1 is a top view of my improved device. Fig. 2 is a side view thereof, the cover of the casing inclosing the several operative parts thereof being removed, and Fig. 3 is a horizontal central section of the device.

Briefly stated, the device comprises a shank which may be secured in the tool-post of a lathe in the same manner as any other machine-tool. Pivoted on this shank and frictionally held thereon is the rod which supports the indicator which is also held frictionally on said rod and adapted to be rotated relatively to said rod. The indicating mechanism comprises a feeler projecting beyond the casing and which is adapted to engage the work, this indicator being connected by intervening mechanism with an index pointer whereby the movement of the feeler may be determined at a glance.

Referring to the drawings, the numeral 10 denotes the feeler-member of the device having a rounded head 11 and a reduced portion 12 whereby said member is rigidly secured in a lever 13 which is fulcrumed on a stud 14 rigidly held on the bottom plate 15 of the casing which contains the operating parts. This casing is provided with an annular rim 16, the front edge of which is counterbored as at 17 (see Figs. 2 and 3) to receive a cover 18 which may be held in place on the casing by screws 19 in screw threaded engagement with the base plate 15 above referred to.

The lever 13 is preferably arcuate in form to correspond with the curvature of the casing-flange 16 and engages with its free end 20 an actuator 21 pivoted on a stud 22 also secured in the base plate 15, the free end of the actuator 21 resting against a pin 23 secured on the arm 24, the free end of which projects through a slot 25 in the casing-flange 16 and carries an index pointer 26 coöperating with a series of indicator marks shown in Fig. 1. The arm 24 is normally moved toward one end wall of the slot 25 (as seen in Fig. 1) by a blade spring 27 in engagement with a pin 28 which is also secured to the arm 24. It will be seen that by virtue of this organization any force which will be applied against the head 11 of the feeler-member to swing the lever 13 toward the center of the casing will result in moving the arm 24 around its pivot pin 29 which is preferably secured to said arm 24 and adapted to enter a recess provided therefor in the inwardly projecting hub 30 of the casing plate 15, and, furthermore, that for equal units of movement of the feeler-member 11, by reason of the change of location of the contact points with respect to the pivots of several of the members, said index pointer 26 will move for unequal spaces so that consequently the graduations on the casing-flange will be unequally spaced to represent uniform movements of the feeler-member.

Extending laterally from the casing plate 15, is a hub 31 which is preferably split and fits in a corresponding aperture provided in the head-portion 32 of a supporting rod 33 whereby the instrument is supported. The hub 31 has also a screw threaded aperture to receive a screw 34 having a conical upper portion 35 adapted to engage the conically bored outer end of the hub 31 for the purpose of expanding the split hub into the aperture of the head-portion 32 for the purpose of frictionally holding the casing in the rod. It will, therefore, be seen that by loosening the screw 34, the casing in its entirety may be rotated in the holder rod 33 so as to bring the feeler-member into any desired position relative to the work to be gaged and within the compass or reach of the center of said hub 31.

Means are provided for positioning the indicator bodily relatively to the work to be tested without necessitating any change in the position of the shank in the tool-post of a lathe, these means comprising a frictional device for holding the rod 33 on the shank 40 which is adapted to be placed in a tool-post indicated by dot-and-dash lines 41.

The forward end of the shank 40 carries a stud 42 having a head 43 and also having an aperture through which said rod 33 may freely pass longitudinally and rotatably. The particular means for clamping the rod 33 on the stud 42 comprise a washer 44 interposed between the rod 33 and the face of the shank 40. It will, therefore, be seen that by loosening the nut 46, the rod 33 may be slid longitudinally through the stud 42 and the washer carried thereby, and that, furthermore, said rod 33 may be rotated therein so as to bring the feeler-member into any desired position. It will also be understood that by virtue of this construction, namely, the frictional means for holding the indicator on the shank in every direction, any danger of breaking the instrument will be avoided, inasmuch as any overpressure exerted on the feeler-member 10 will result in swinging the entire device, the only rigid part of which is the shank 40 in the tool-post 41.

Many changes may be made in the particular construction of the clamping members and also in the shape and organization of the active members of the indicator without departing from the spirit of the invention.

I claim:—

1. In a device of the character described, the combination with a casing having an annular rim said rim being provided with a slot, a cover adapted to fit within said annular rim, an index arm pivoted centrally relative to said rim extending through said slot, said index arm being provided with a pin on each side of its pivot, an arcuated lever pivoted in said case, a feeler member provided with a rounded head secured to said arcuated lever and projecting through said rim, an actuator pivoted in said casing in engagement with the end of said lever and having its end in engagement with one of the pins on the index arm, and a spring suitably secured at one end to said case and having its opposite end in engagement with a pin on the index lever for returning said index arm to its normal position.

2. In combination in an indicator, a casing having a wall with a slot therein, an index arm pivoted centrally within the casing and having a pin on each side of its pivot, an arcuated lever pivoted in said case, a feeler member provided with a head and secured to said arcuated lever and projecting through said slot, an actuator pivoted in said casing in engagement with the end of said lever and having its end in engagement with one of the pins on the index arm, and a spring secured at one end to said casing and having its opposite end in engagement with a pin on the index lever for returning said index arm to its normal position.

LEWIS L. LEIGH.

Witnesses:
JOHN L. BONEL,
CHAS. F. SCHMETZ.